(12) United States Patent  
Moore

(10) Patent No.: US 7,658,144 B2  
(45) Date of Patent: Feb. 9, 2010

(54) AVOCADO DE-SKINNING APPARATUS

(76) Inventor: Richard E. Moore, 1292 Calpella Ct., Chula Vista, CA (US) 91913

( * ) Notice: Subject to any disclaimer, the term of this patent is extended or adjusted under 35 U.S.C. 154(b) by 158 days.

(21) Appl. No.: 11/845,184

(22) Filed: Aug. 27, 2007

(65) Prior Publication Data

US 2008/0044535 A1    Feb. 21, 2008

Related U.S. Application Data

(63) Continuation-in-part of application No. 11/280,068, filed on Nov. 16, 2005, now Pat. No. 7,444,930.

(51) Int. Cl.
*A23L 1/00* (2006.01)

(52) U.S. Cl. ............... 99/585; 99/623; 99/628
(58) Field of Classification Search ........... 99/584–589, 99/623–630, 537, 538–541; 426/481–483
See application file for complete search history.

(56) References Cited

U.S. PATENT DOCUMENTS

| | | | | |
|---|---|---|---|---|
| 2,500,981 A | * | 3/1950 | Eymeric ...................... 99/565 |
| 2,659,298 A | * | 11/1953 | Hudson ..................... 100/98 R |
| 3,351,000 A | * | 11/1967 | Bruce ........................ 100/98 R |
| 3,480,057 A | * | 11/1969 | Wilhelm ..................... 426/287 |
| 3,482,615 A | * | 12/1969 | Adle et al. .................. 426/482 |
| 3,618,651 A | * | 11/1971 | Hart et al. ................... 426/287 |
| 3,811,000 A | * | 5/1974 | Lazzarini .................... 426/483 |
| 3,818,821 A | * | 6/1974 | Kendall, Jr. .................. 99/540 |
| 3,862,345 A | * | 1/1975 | Westover et al. ............. 426/262 |
| 3,964,715 A | * | 6/1976 | Burgess, Jr. ..................... 241/7 |
| 4,355,572 A | * | 10/1982 | Silvestrini .................... 99/516 |
| 4,600,593 A | * | 7/1986 | Swisher ...................... 426/438 |
| 4,629,629 A | * | 12/1986 | David ........................ 426/482 |

* cited by examiner

*Primary Examiner*—Timothy F. Simone
(74) *Attorney, Agent, or Firm*—Frank G. Morkunas

(57) ABSTRACT

An avocado de-skinning apparatus having two generally vertically disposed rotating drums. The rotating drums rotate inward to pinch the skin of an avocado and force the off and through a gap defined between the rotating drums. A driver in the gap and in the upper section of the rotating drums aids in forcing the skin from the avocado and into the gap and through the rear side of the rotating drums. A skin scraper removes any skin adhering to the drums and a pulp scraper retrieves any pulp adhering to the drums for further processing.

15 Claims, 3 Drawing Sheets

US 7,658,144 B2

AVOCADO DE-SKINNING APPARATUS

CROSS REFERENCES TO RELATED APPLICATIONS

This application is a continuation-in-part of nonprovisional application, application Ser. No. 11/280,068, filed on Nov. 16, 2005 now U.S. Pat. No. 7,444,930.

STATEMENT REGARDING FEDERALLY-SPONSORED RESEARCH OR DEVELOPMENT

Not applicable.

BACKGROUND

This present invention relates to an improvement in removing skin and pulp from avocados and more particularly to retrieving more usable pulp from the avocado for processing.

Avocados have become more and more popular for their versatility and arguable health-related benefits. They come in various varieties and sizes. For example, West Indian avocados produce enormous, smooth round, glossy green fruits that are low in oil and can weigh up to two pounds. Guatemalan types produce medium ovoid or pear-shaped, pebbled green fruits that turn blackish-green when ripe. The fruit or pulp of Mexican varieties are smaller (six to ten ounces) with skins that turn glossy green or black when ripe.

Regardless the pulp of avocados is deep green near the skin, becoming yellowish nearer the single large, inedible ovoid seed. The pulp is hard when harvested but softens to a buttery texture. Avocados are high in monosaturates and the oil content is second only to olives among fruits. Clinical feeding studies in humans have shown that avocado oil can reduce blood cholesterol.

In many cases, fruits (such as avocados) and vegetables are more easily de-skinned by the heating of these foods. Such heating does not adversely affect the flavor, texture, or appearance of most such foods. Processing avocados by first heating for the purpose of de-skinning them, however, is not nutritionally sound. Avocados are a fruit which is extremely sensitive to heat. This is particularly so in its green (chlorophyll) layer of its pulp as it lies immediately below the skin and, consequently, is subject to greatest heat exposure and nutritional loss and flavor loss. Additionally, avocado skins are particularly thick and/or rough and most processing techniques are manual or if mechanized, the apparatus is expensive, complex, and not as efficient as desired in that usable pulp is lost in the process.

Because of their popularity and growing popularity, and commercialization of avocados, a need existed to effectively and efficiently remove the pulp from an avocado for processing regardless of the size or type of avocado being processed. The prior art has numerous de-skinning or peeling machines and pulp or fruit removal machines which have been cited in this application. Most are extremely complex, somewhat cumbersome, and costly to manufacture and maintain. None is as simple as the apparatus described in my pending application nor as the apparatus described herein which is an improvement to the apparatus of my pending application. In spite of the seeming simplicity of both each apparatus, none of the prior art devices is as efficient or effective.

The objects of the presently described apparatus are to:

a. effectively and efficiently guide an avocado into a de-skinning apparatus for de-skinning the avocado.

b. effectively and efficiently de-skin an avocado and dispose of the unwanted skin.

c. effectively and efficiently remove the pulp from an avocado and retrieve the pulp for later use.

d. effectively and efficiently remove avocado skin remnants remaining on the apparatus to thereby prevent the skin remnants from mixing with the removed pulp.

e. effectively and efficiently remove pulp remnants remaining on the apparatus to thereby increase the usable volume of pulp.

The foregoing has outlined some of the more pertinent objects of the presently described apparatus. These objects should be construed to be merely illustrative of some of the more prominent features and applications of the intended and presently described apparatus. Many other beneficial results can be attained by applying the presently described apparatus in a different manner or by modifying the presently described apparatus within the scope of the disclosure. Accordingly, other objects and a fuller understanding of the presently described apparatus may be had by referring to the summary and the detailed description of the preferred embodiment in addition to the scope of the presently described apparatus as defined by the claims taken in conjunction with the accompanying drawings.

BRIEF SUMMARY OF THE INVENTION

The above-noted problems, among others, are overcome by the presently described apparatus. Briefly stated, the presently described apparatus contemplates an avocado de-skinner having two generally vertically disposed rotating drums which rotate inward. The rotating drums pinch the skin of an avocado and force it off the avocado and through a gap which is between the rotating drums. A guide plate and cooperating conveyor belt with upstanding fins guide the avocado to and into the drums for de-skinning. A skin scraper at the rear side of the rotating drums removes skin adhering to the drums. A pulp scraper to the front of the skin scraper retrieves any pulp adhering to the drums for further processing.

The foregoing has outlined the more pertinent and important features of the presently described apparatus in order that the detailed description thereof which follows may be better understood so the present contributions to the art may be more fully appreciated. Additional features of the presently described apparatus will be further described hereinafter and which will form the subject of the claims. It should be appreciated by those skilled in the art that the conception and the disclosed specific embodiment may be readily utilized as a basis for modifying or designing other structures and methods for carrying out the same purposes of the presently described apparatus. It also should be realized by those skilled in the art that such equivalent constructions and methods do not depart from the spirit and scope of the presently described apparatus as set forth in the appended claims.

BRIEF DESCRIPTION OF THE DRAWINGS

For a fuller understanding of the nature and objects of the presently described apparatus, reference should be had to the following detailed description taken in conjunction with the accompanying drawings in which.

DETAILED DESCRIPTION OF THE INVENTION

Figure 1:
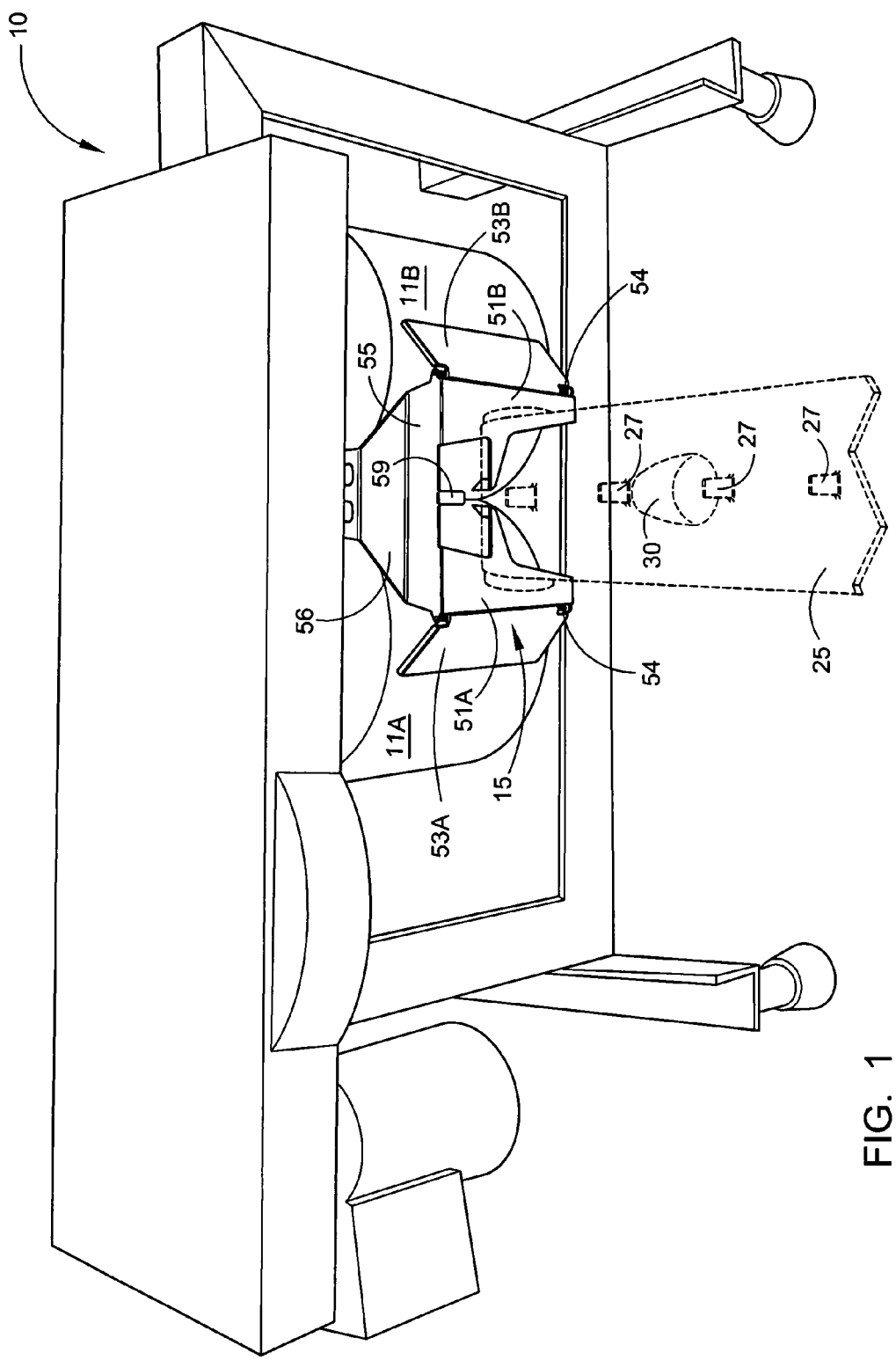
FIG. 1 is perspective view of the apparatus.
Figure 2:
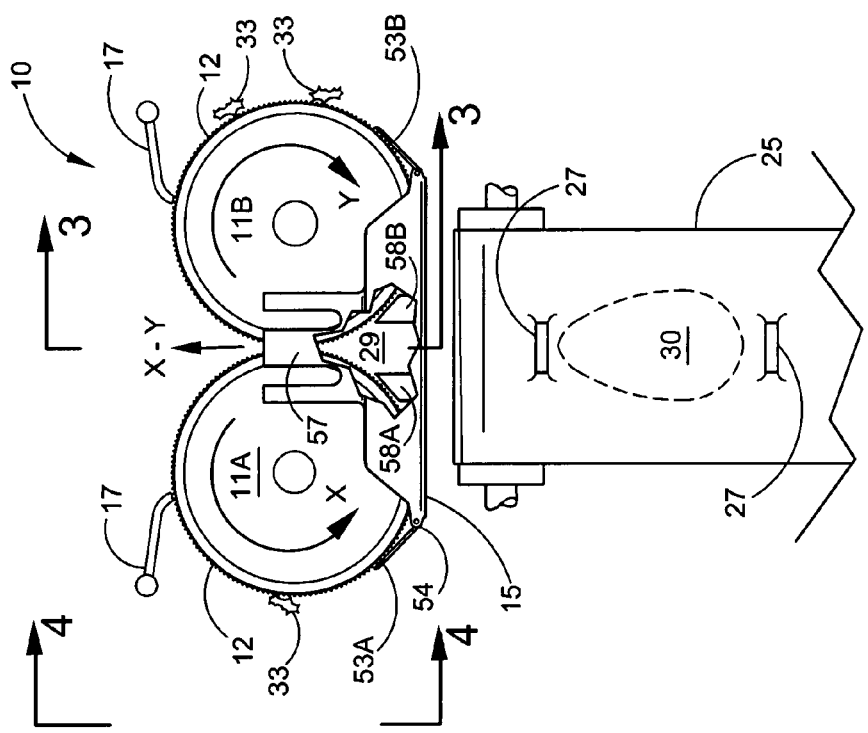
FIG. 2 is a top plan view of the apparatus.

Referring now to the drawings in detail and in particular to FIGS. 1 and 2, reference character 10 generally designates an avocado de-skinning apparatus constructed in accordance with a preferred embodiment of the presently described apparatus. Two upstanding, generally vertically disposed, drums 11A, 11B are adjacent to one another but do not touch. A gap 29 is formed at their point of adjacency. The drums 11A, 11B are rotated in tandem in the directions of Arrows X, Y, respectively.

Figure 3:
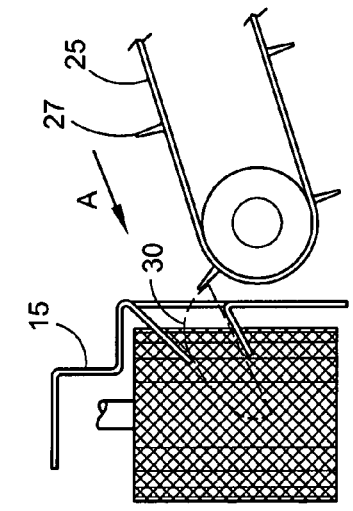
FIG. 3, as taken on line 3-3 of FIG. 2, is a detailed side view of the apparatus.
Figure 4:
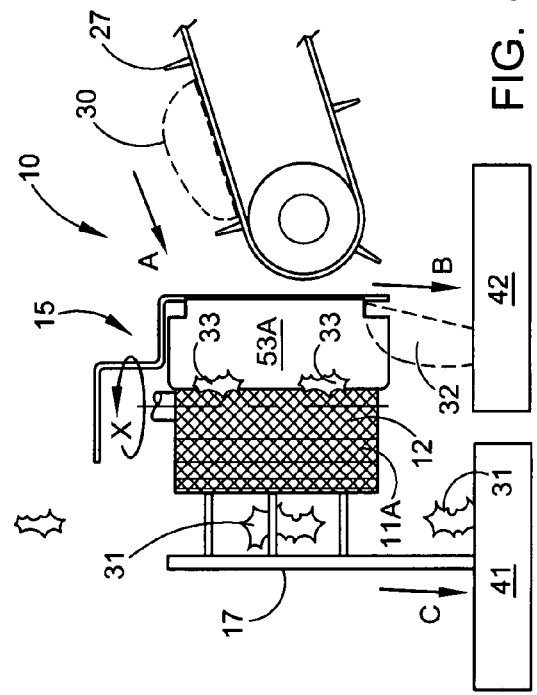
FIG. 4 is a side view of the apparatus.

A conveyer belt 25 with upstanding fins 27 retain and guide an avocado 30 to the apparatus 10 and into the guide plate 15. An avocado sits between two fins 27. For the purpose of discussion, the fin at the front of the avocado is the leading fin and the fin at the rear of the avocado is the trailing fin. The trailing fin pushes the avocado into the guide plate 15 and to the drums 11A, 11B which have a triangular-like opening or gap 29. Once forced into the gap 29 and the rotating drums 11A, 11B, the avocado will be de-skinned. FIGS. 3 and 4 illustrate the movement of an avocado 30 and the processing.

An avocado 30 may be pre-prepared by having been cut in half and the pit may, but need not have been, removed. In the embodiment of the apparatus as illustrated in FIGS. 1-4, the pit should generally be removed prior to the avocado 30 being conveyed to the drums 11A, 11B A conventional motor with suitable gears and shafts (not shown) are connected to the drums 11A, 11B to effect the rotation of the drums. Similarly, a conventional motor (not shown) is connected to the conveyor belt 25 to effect the movement of the conveyor belt 25 and avocados in the direction of Arrow A.

For best efficiency, the drums 11A, 11B are roughened or knurled 12. As the avocado 30 is being forced into the gap 29, The rotating knurled drums 11A, 11B grab the skin 31 off the avocado 30 and pull the skin 31 through the rotating drums 11A, 11B, in the direction of Arrow XY until, at the rear of the drums 11A, 11B the skin 31 falls out and down in the direction of Arrow C into a suitable skin disposal unit 41 for ultimate disposition.

As the skin 31 is being removed by the gap/drum combination 29, 11A, 11B at the front of the drums 11A, 11B, most of pulp remains for retrieval. After de-skinning therefore, the whole pulp 32 falls down in the direction of Arrow B and into a suitable pulp retrieval unit 42. An residual pulp 33 may adhere to the drums 11A, 11B but will be scraped off and likewise retrieved.

A skin de-scaler 17, generally a pronged scraper, is located at the rear of each drum 11A, 11B to remove any skin 31 which does not fall down and into the skin disposal unit 41 of its own accord to thereby remove the skin 31 from the surface of the respective drum and allow it to drop into the skin disposal unit 41. A doctor or blade or pulp scraper 53A, 53B, on the guide plate 15 at the front of the drums 11A, 11B, captures and removes any pulp adhering to the respective drum and thereby permit the pulp to fall into the pulp retrieval unit 42.

As configured, the skin disposal unit 41 is below and to the rear of the drums 11A, 11B and below the pronged scrapers 17. The pulp retrieval unit 42 is below the gap 29 to the front of the drums 11A, 11B and below the doctor 53A, 53B of the guide plate 15.

The gap 29 may be of any width suitable for the intended purpose but a width ranging from approximately 1/12 of an inch to approximately 1/4 of an inch will produce good results but a width range from approximately 1/8 of an inch to approximately 1/6 of an inch will produce better and more effective and efficient results. If the gap 29 is too narrow, part of all of the skin 31 will not be forced through the gap 29. If the gap 29 is too wide, it will cause some or all of the whole pulp 32 therethrough.

Figure 5:
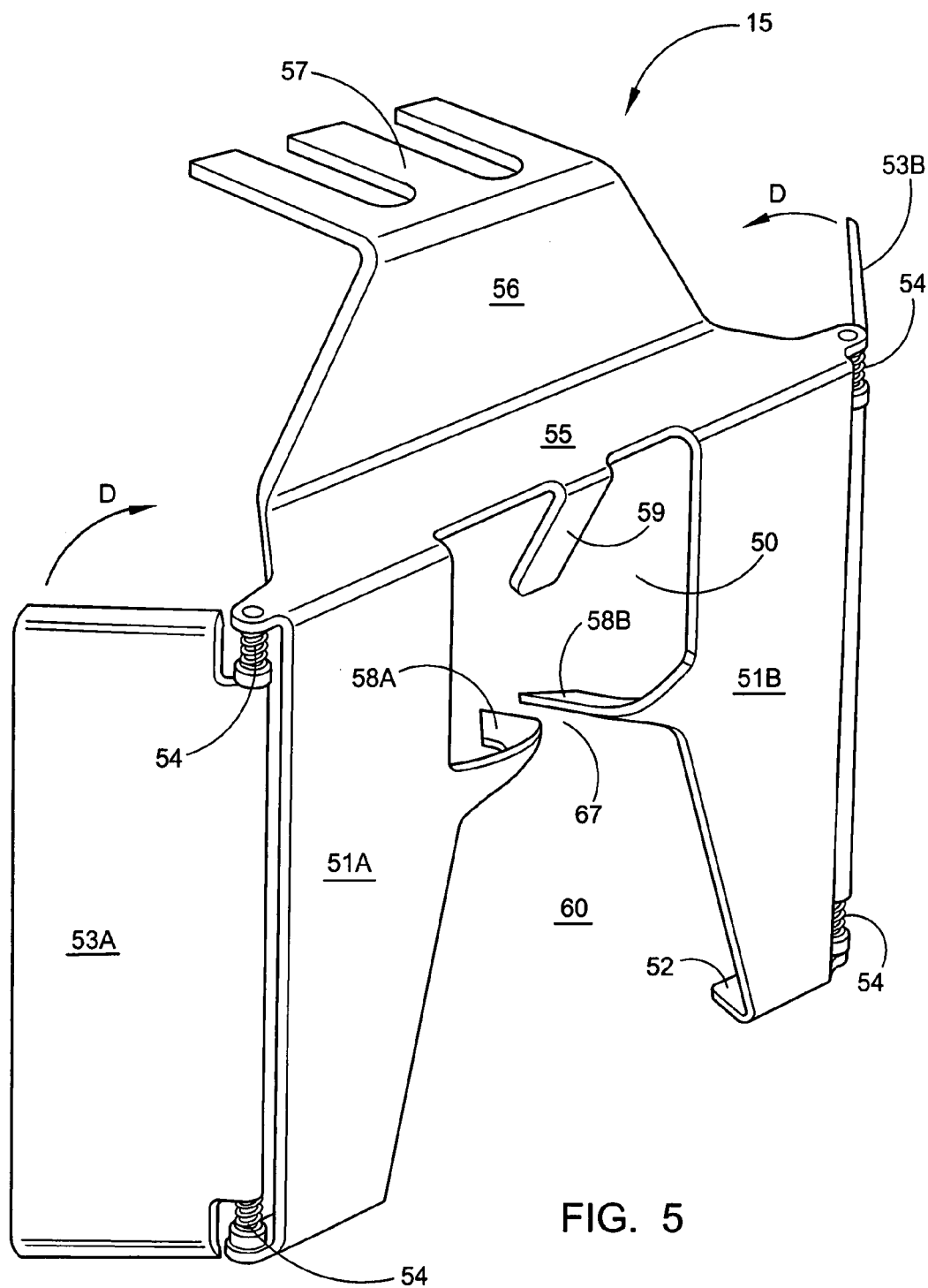
FIG. 5 is a detailed view of the guide plate for the apparatus.

FIG. 5 illustrates the detail of the guide plate 15. The guide plate 15 in the lynch-pin to the registration and feeding an avocado 30 into the apparatus for de-skinning. The top plate section 55 has an upward extending section 56 with rearward extending fingers 57 for a secure mounting and attachment of the guide plate 15 to the apparatus.

A plate front member 51A, 51B extends downward from the top plate section 55. This is a two-piece section consisting of a left side section 51A and a right side section 51B each having a forward extending bottom tab 52 which facilitates attachment. The outer edges of each side section 51A, 51B each have a respective side member 53A, 53B which are pivotably and biasedly attached to their respective front side sections 51A, 51B by a biasing component 54. The force of the biasing is in the direction of each adjacent drum 11A, 11B such that the side members 53A, 53B are forced to the drums 11A, 11B [Arrow D] and serve as a doctor blade to scrape any residual pulp 33 adhering to the drums 11A, 11B as they rotate from previously de-skinned avocados.

A central space is defined between the left side section 51A and the right side section 51B. An upper guide arm 59 extends downward and inward from the plate top section 55. A left side guide arm 58A extends inward from the left side section 51A and rearward of the left side section 51A toward the drums 11A, 11B. Similarly right side guide arm 58B extends inward from the right side section 51B and rearward of the right side section 51B toward the drums 11A, 11B.

Each such guide arm 58A, 58B is substantially below the upper guide arm 59 and by such configuration defines a first gap 50 in the space. A second gap 60 is defined below the first gap 50. The two guide arms 58A, 58B do not touch but leave a guide space 67 therebetween of sufficient width as to permit the passage of the fins 27 of the conveyor belt 25. Consequently, as the conveyor belt 25 is bringing avocados to the apparatus 10, the conveyor belt 25 passes into the second gap 60 and the fins 27 pass through the guide space 67. In the process the avocado 30 is pushed into the first gap 50. The upper guide arm 59 and side guide arms 58A, 58B register the avocado 30 for a proper receipt thereof into the rotating drums 11A, 11B for de-skinning.

The present disclosure includes that contained in the present claims as well as that of the foregoing description. Although this presently disclosed apparatus has been described in its preferred forms with a certain degree of particularity, it is understood that the present disclosure of the preferred forms has been made only by way of example and numerous changes in the details of construction and combination and arrangement of parts and method steps may be resorted to without departing from the spirit and scope of the presently described apparatus. Accordingly, the scope of the presently described apparatus should be determined not by the embodiments illustrated, but by the appended claims and their legal equivalents.

What is claimed is:

1. An apparatus for removing skin from an avocado leaving its pulp comprising:

(a) a first drum approximately vertically disposed and rotatable on its axis;

(b) a second drum approximately vertically disposed and rotatable on its axis, said second drum adjacent to said first drum defining a drum gap therebetween;

(c) a registration means for aligning an avocado for disposition into said drum gap; and (d) an input means for conveying an avocado to said registration means and forcing said avocado into said drum gap and onto said first drum and said second drum;

whereby as said first drum and said second drum rotate inward toward said drum gap they pinch skin of the avocado forcing the skin off the avocado and through said drum gap while permitting the pulp as a whole to drop.

2. The apparatus as claimed in claim 1 further comprising scraper means to the rear of said first drum or to the rear of said second drum or both, said scraper means for removing the skin from said first drum or said second drum or both.

3. The apparatus as claimed in claim 2 further comprising a disposal means for capturing the skin, said disposal means below each of said scraper means.

4. The apparatus as claimed in claim 1 wherein said first drum and said second drum each have surfaces which are knurled.

5. The apparatus as claimed in claim 1 wherein said registration means comprises a guide plate comprising:

(a) attachment means for attaching said guide plate to said avocado de-skinning apparatus;

(b) receiving means for receiving said avocado and passing said avocado through said guide plate to said at least two rotatable drums;

(c) a front member comprised of a left side section and a right side section downwardly attached to a top section and separated by a space, each said side section having a top, a bottom, a left side edge, and a right side edge, said front member extending downward from said attachment means; and (d) a left side member pivotably attached to the left side edge of said left side section of said front member and a right side member pivotably attached to the right side edge of said right side section of said front member wherein said left side member is adapted to scrape residue pulp from said first drum and said right side member is adapted to scrap residue pulp from said second drum.

6. The apparatus as claimed in claim 5 wherein said receiving means comprises an upper arm on said top section of said front member and in said space, said upper arm angled downward and rearward.

7. The apparatus as claimed in claim 5 wherein said receiving means comprises a first lower arm extending inward from the right side edge of said left side section and rearward therefrom, and a second lower arm extending inward from the left side edge of said right side section and rearward therefrom thereby defining a first gap above and a second gap below.

8. The apparatus as claimed in claim 5 further comprising bias means on said left side member at it point of attachment to the left side edge of said left side section of front member, said bias means for biasing said left side member into one of said at least two rotatable drums.

9. The apparatus as claimed in claim 5 further comprising bias means on said right side member at it point of attachment to the right side edge of said right side section of front member, said bias means for biasing said right side member into one of said at least two rotatable drums.

10. The apparatus as claimed in claim 5 further comprising a retrieval means below said guide plate for retrieving the pulp.

11. A guide plate for an avocado de-skinning apparatus having at least two rotatable drums, said guide plate comprising:

(a) attachment means for attaching said guide plate to said avocado de-skinning apparatus;

(b) receiving means for receiving said avocado and passing said avocado through said guide plate to said at least two rotatable drums;

(c) a front member comprised of a left side section and a right side section downwardly attached to a top section and separated by a space, each said side section having a top, a bottom, a left side edge, and a right side edge, said front member extending downward from said attachment means; and (d) a left side member attached to the left side edge of said left side section of front member and a right side member attached to the right side edge of said right side section of said front member.

12. The guide plate as claimed in claim 11 wherein said receiving means comprises an upper arm on said top section of said front member and in said space, said upper arm angled downward and rearward.

13. The guide plate as claimed in claim 11 wherein said receiving means comprises a first lower arm extending inward from the right side edge of said left side section and rearward therefrom, and a second lower arm extending inward from the left side edge of said right side section and rearward therefrom thereby defining a first gap above and a second gap below.

14. The guide plate as claimed in claim 11 further comprising bias means on said left side member at it point of attachment to the left side edge of said left side section of front member, said bias means for biasing said left side member into one of said at least two rotatable drums.

15. The guide plate as claimed in claim 11 further comprising bias means on said right side member at it point of attachment to the right side edge of said right side section of front member, said bias means for biasing said right side member into one of said at least two rotatable drums.

* * * * *